United States Patent [19]

Van Gorder

[11] 4,217,926
[45] Aug. 19, 1980

[54] THERMALLY CONTROLLED OIL STORAGE RESERVOIR FOR A TRANSMISSION

[75] Inventor: Jack H. Van Gorder, Chelsea, Mich.

[73] Assignee: General Motors Corporation, Detroit, Mich.

[21] Appl. No.: 964,595

[22] Filed: Nov. 29, 1978

[51] Int. Cl.² .................. G05D 9/00; F16K 49/00
[52] U.S. Cl. .................. 137/389; 74/606 A; 123/196 AB; 123/196 S; 137/468; 184/104 R; 251/11
[58] Field of Search .......... 137/386, 468, 389, 101.27; 123/196 R, 196 S, 196 AB; 251/11; 184/103 R, 104 A, 104 R; 74/467, 606 A; 236/101 E, 101 C, 93 R

[56] References Cited

U.S. PATENT DOCUMENTS

| | | | |
|---|---|---|---|
| 1,219,516 | 3/1917 | Whittelsey | 137/468 |
| 1,710,278 | 4/1929 | Tulowitz | 184/104 R |
| 1,992,789 | 2/1935 | Veale | 137/468 |
| 2,081,315 | 5/1937 | Weber | 184/103 R |
| 2,207,527 | 7/1940 | Weber | 184/103 R |
| 2,213,147 | 8/1940 | Parkins et al. | 123/196 R |
| 2,275,576 | 3/1942 | Ware | 123/196 AB |
| 2,524,798 | 10/1950 | Hoskinson | 184/104 A |
| 2,788,176 | 4/1957 | Andersen | 123/196 AB |
| 3,196,899 | 7/1965 | Lattemann | 251/11 |
| 3,874,183 | 4/1975 | Tabet | 74/606 A |

Primary Examiner—Irwin C. Cohen
Assistant Examiner—G. L. Walton
Attorney, Agent, or Firm—Donald F. Scherer

[57] ABSTRACT

An oil storage reservoir has a fluid flow passage which returns fluid to the main transmission reservoir. The storage reservoir is supplied with fluid by the transmission control system and the amount of fluid that returns to the main reservoir from the storage reservoir is controlled by a thermally responsive valve mechanism such that, as the fluid temperature increases, the flow passage is reduced so that the level of oil in the storage reservoir is increased. Thus, the change in fluid volume, due to temperature change, is accommodated by the storage tank as controlled by the thermally responsive valve.

3 Claims, 4 Drawing Figures

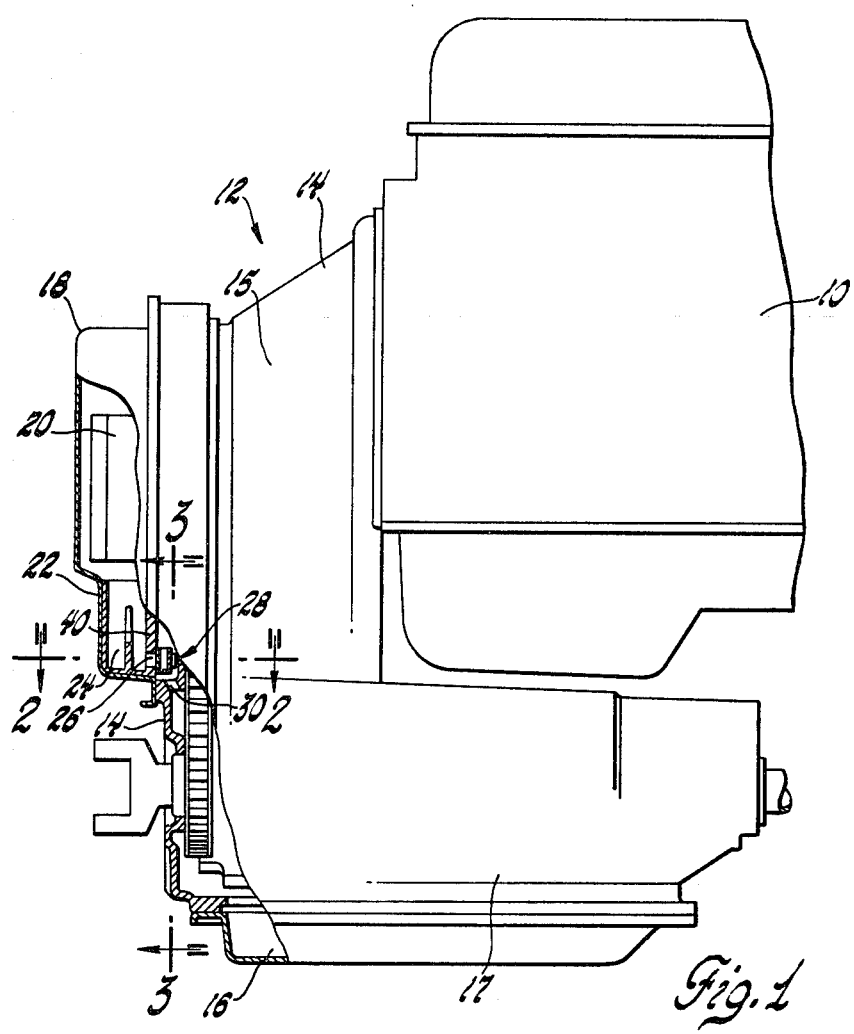
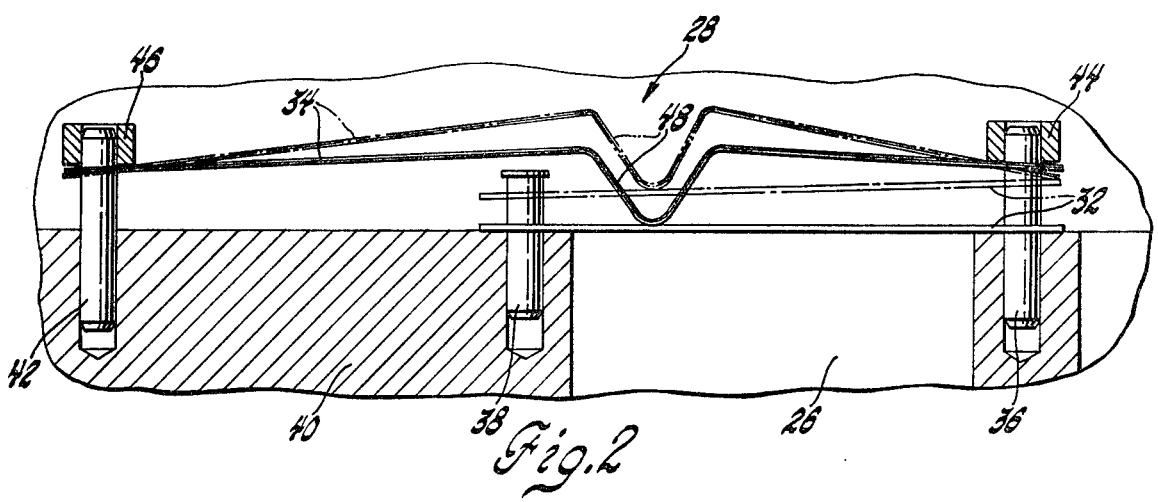

THERMALLY CONTROLLED OIL STORAGE RESERVOIR FOR A TRANSMISSION

This invention relates to fluid storage reservoirs and more particularly to fluid storage reservoirs having a thermal control for accommodating a variable fluid level therein.

It is an object of this invention to provide an improved storage reservoir for storing excess fluid from a transmission sump wherein the fluid level in the storage reservoir increases as fluid temperature increases.

It is another object of this invention to provide an improved fluid storage reservoir for a power transmission wherein a thermally responsive valve controls the fluid flow from the storage reservoir to the main transmission reservoir in response to temperature changes in the fluid.

A further object of this invention is to provide an improved fluid storage reservoir for a power transmission wherein the fluid storage reservoir receives fluid from the transmission control and has a valve incorporated therein which includes a thermally responsive spring element for controlling the valve opening in response to fluid temperature changes so that volume changes in the fluid due to temperature differentials are accommodated by the fluid storage reservoir.

These and other objects and advantages of the present invention will be more apparent from the following description and drawings in which:

FIG. 1 is a side elevational view partly in section of a transmission incorporating one embodiment of the present invention;

FIG. 2 is an enlarged sectional view taken along line 2—2 of FIG. 1;

Figure 3:
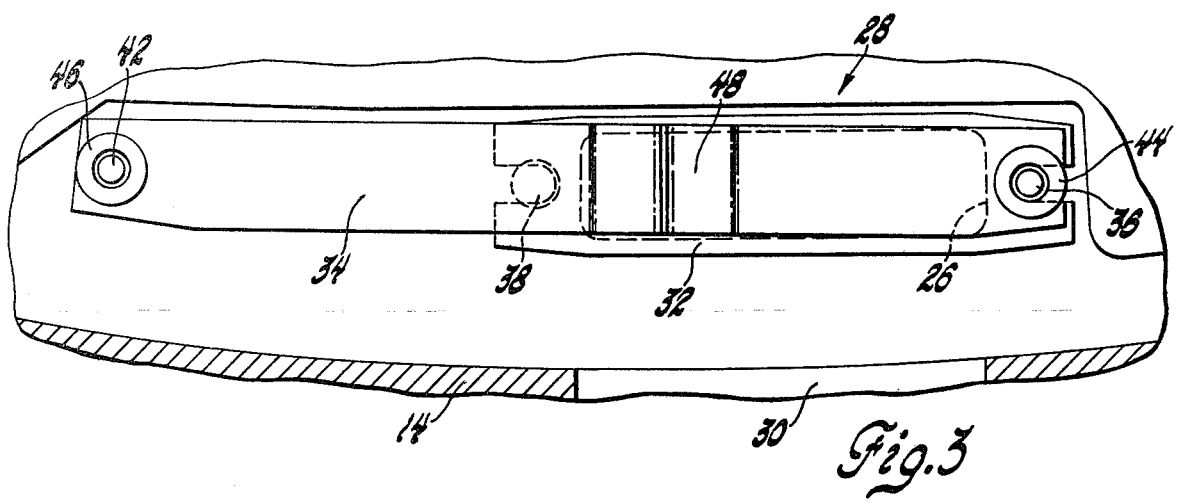
FIG. 3 is an enlarged view taken along line 3—3 of FIG. 1.

Referring to the drawings, there is seen in FIG. 1, a conventional engine 10 and a transmission generally designated 12. The transmission has a housing 14 with an upper portion 15 secured to the engine 10 and enclosing a torque converter, not shown, and a lower portion 17 which houses the transmission gearing, not shown.

The transmission has a sump or main reservoir 16 which normally accommodates the hydraulic fluid necessary to operate the transmission components. The transmission 12 also has an end cover 18 which encloses the end of the upper portion 15 of the transmission 14 and houses a conventional internal/external type gear pump, not shown, and a transmission control system which is housed in a valve body 20. The end cover 18 has a lower portion 22 which houses a fluid storage reservoir 24 having an outlet passage 26 controlled by a valve assembly, generally designated 28. The transmission housing 14 has a passage 30 formed therein which receives hydraulic oil from passage 26 and permits the oil to return to the transmission sump 16.

As best seen in FIG. 2, the valve assembly 28 includes a plate 32 and a spring 34. The plate 32 is slidably mounted on a pair of pins 36 and 38 which are secured in a wall 40 of the reservoir 24 through which the passage 26 extends. One end of spring 34 is loosely assembled on a pin 36 and the other end thereof is loosely assembled on a pin 42 which is also pressed into wall 40. The spring 34 is positioned on the pins 36 and 42 by stop members 44 and 46 which are pressed onto pins 36 and 42, respectively. The spring member 34 has a central V-shaped section 48 which abuts the plate 32 so that the spring force urges the plate 32 in a closing direction relative to passage 26 and urges the ends of the spring against respective stop members 44 and 46. The spring 34 is constructed of a bi-metal material such that the force in the spring urging the plate 32 in a closing direction increases as the temperature increases.

When the transmission is operating, fluid leakage from valve body 20 is directed to the reservoir 24 for storage. If the fluid temperature is low, the plate 32 will be easily moved to open passage 26 so that the fluid can return to the transmission sump 16. As the fluid temperature increases, the force in spring 34 increases requiring a higher oil level in reservoir 24 before the plate 32 can be forced open. As is well known, oil expands with increasing temperature creating an increase in volume. If the increase in volume of oil is not stored in a separate storage reservoir, the fluid level of the transmission sump can increase such that the oil therein will come in contact with the rotating parts of the transmission which is undesirable. It is therefore seen from the above description, that the storage reservoir 24 will accommodate an increase in oil level when the oil temperature increases, and the change in the rate of spring 34 due to temperature change, is preferably designed such that the oil level in the main transmission sump 16 will be maintained at a substantially constant level regardless of fluid temperature.

Figure 4:
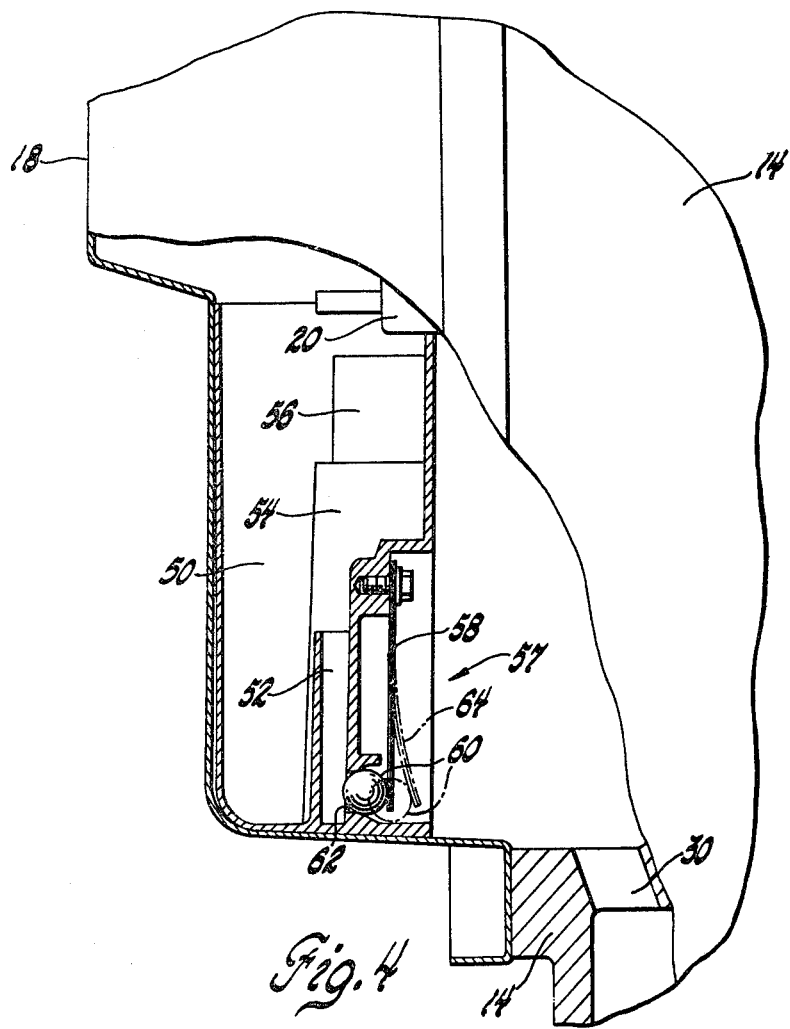
FIG. 4 is an elevational view showing another embodiment of the invention.

The embodiment shown in FIG. 4, has an oil storage reservoir 50 which is divided into chambers or compartments 52, 54 and 56. These compartments have different heights such that the fluid within the storage reservoir 50 can be maintained at various levels. Each of the chambers 52, 54 and 56 has a control valve mechanism associated therewith. The valve 57 controls chamber 52. Similar valve mechanisms control chambers 54 and 56 but are not shown for the sake of clarity. The description of valve 57 should suffice as a description for the other valves. The valve 57 is comprised of a bi-metal spring 58 and a ball 60. The ball 60 is seated in an opening 62 by the force in spring 58. When the fluid temperature is low, for example, 50° F. or less, the bi-metal spring 58 will assume the position shown by phantom lines 64, such that the ball 60 will permit the oil in the chamber 52 to return through passage 30 to the main transmission sump. The valve which controls chamber 54 will remain open to a temperature higher than the valve 57, for example, 150° F., while the valve controlling chamber 56 will remain open until the fluid temperature reaches an even higher level, for example, 250° F. Thus, when the fluid temperature reaches 50° F., the chamber 52 will be closed so that the oil levels of storage reservoir 50 will have to increase to the level of chamber 54 before returning to sump 16 and when the oil temperature reaches 150° F., the oil level in storage reservoir 50 will have to increase to the level of chamber 56 before it can be returned to the main transmission sump 16. The control valve for the chambers 52, 54 and 56 can be designed so that the closing force imposed by their respective bi-metal springs increases at a rate which will permit variable oil levels to be maintained since it is well known that a valve can be opened by a pressure head which provides an opening force equal to the spring closing force.

The storage reservoirs 24 and 50 are accommodated within the space available for the transmission package such that external lines and passages are not required thereby reducing the possibility of oil loss through leakage from an externally positioned storage reservoir.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A thermally controlled oil storage reservoir for a transmission comprising; a transmission housing; a primary oil reservoir disposed below said transmission housing; a source of oil pressure and passage means for said transmission including an oil return passage; a storage reservoir in communication with said return passage, disposed on said transmission housing above said primary oil reservoir and having aperture means in communication with said primary oil reservoir; flow control means for closing said aperture means to control oil flow from said storage reservoir to said primary reservoir; and thermostatic element means for applying a force to said flow control means urging said flow control means toward closing said aperture means with said force increasing with increasing oil temperature and the pressure head of oil in said storage reservoir urges said flow control means in an opening direction whereby the level of oil in said storage reservoir increases with increasing oil temperature prior to opening of said flow control means to permit oil to return through said aperture means to said primary oil reservoir.

2. A thermally controlled oil storage reservoir for a transmission comprising; a transmission housing; a primary oil reservoir disposed below said transmission housing; a source of oil pressure and passage means for said transmission including an oil return passage, a storage reservoir in communication with said return passage, disposed on said transmission housing above said primary oil reservoir and having aperture means in communication with said primary oil reservoir; flow control means including a flat plate member for closing said aperture means to control oil flow from said storage reservoir to said primary reservoir; and bimetallic element means for applying a variable force to said flat plate member urging said flat plate member toward closing said aperture means with said force increasing with increasing oil temperature and the pressure head of oil in said storage reservoir urges said flat plate member in an opening direction whereby the level of oil in said storage reservoir increases with increasing oil temperature prior to opening of said flow control means to permit oil to return through said aperture means to said primary oil reservoir.

3. A thermally controlled oil storage reservoir for a transmission comprising; a transmission housing; a primary oil reservoir disposed below said transmission housing; a source of oil pressure and passage means for said transmission including an oil return passage; a storage reservoir having a plurality of compartments each in communication with said return passage, disposed on said transmission housing above said primary oil reservoir, each compartment having aperture means in communication with said primary oil reservoir, one of said compartments having a predetermined height and each of said other compartments having successively larger heights; flow control means including a spherical member for closing each of said aperture means to control oil flow from said storage reservoir to said primary reservoir; and bimetallic element means for each of said spherical members for applying a force to each of said spherical members urging said spherical members toward closing respective aperture means with said force increasing with increasing oil temperature, one of said spherical members closing the respective aperture at a predetermined temperature and each of the other of said spherical members closing respective apertures at successively higher predetermined temperatures, whereby the height of oil in said storage reservoir is determined by the successive heights of said compartments.

* * * * *